Feb. 22, 1955
L. LAUFER ET AL
2,702,799
RECOVERY OF GLUTATHIONE
Filed Nov. 17, 1950
RECOVERY OF GLUTATHIONE
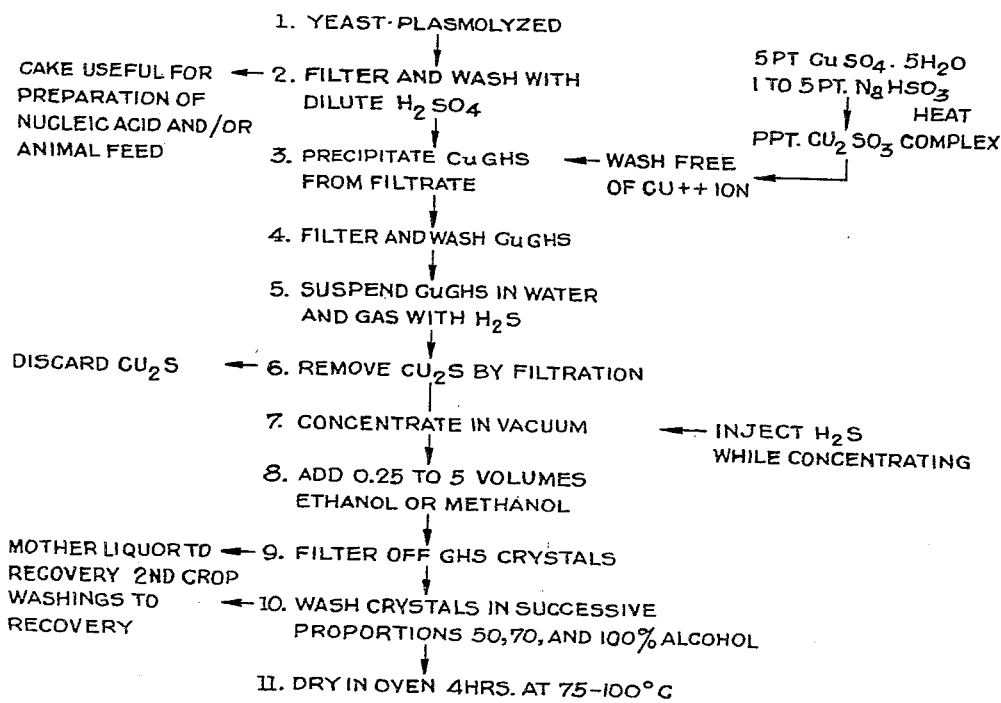
INVENTOR
LOUIS LAUFER
LIONEL C. REED
SIDNEY GUTCHO
BY
Dean Fairbank & Hirsch
ATTORNEYS

United States Patent Office 2,702,799
Patented Feb. 22, 1955

2,702,799

RECOVERY OF GLUTATHIONE

Louis Laufer, Brooklyn, Lionel C. Reed, Mount Vernon, and Sidney Gutcho, New York, N. Y., assignors to Schwarz Laboratories, Inc., New York, N. Y., a corporation of New York Application November 17, 1950, Serial No. 196,278

17 Claims. (Cl. 260—112)

The present invention is concerned with the recovery from suitable natural source thereof such as one celled organisms or tissue, animal or vegetable, but for practical purposes preferably from pressed yeast, of the tripeptide of the sulphur bearing amino acid cysteine with glycine and glutamic acid, which tripeptide is commonly and will hereinafter be designated as glutathione (GHS).

As conducive to a clear understanding of the invention, it is noted that where the plasmolyzed yeast or other biologic extract that constitutes the source of glutathione is treated with salts of copper, lead, mercury or cadmium such as the acetate, in order to precipitate glutathione as the corresponding metal salt thereof, a precipitate results which is contaminated with impurities including the oxidation and hydrolyzation and other degradation products of glutathione, and this necessitates a costly and wasteful refining technique to yield the desired pure glutathione end product. While the use of cuprous oxide for such purpose does result in a relatively pure precipitated cuprous compound of the glutathione without excessive contamination, that procedure is yet uneconomical because (a) the cuprous oxide must be added with meticulous care since, even a small excess beyond that required for complete precipitation of the glutathione would result in re-solution of the precipitate, so that the yield becomes poor; (b) due more especially to the presence of oxygen in the solution the precipitate resulting from treatment with cuprous oxide must be removed promptly from solution in order to prevent its oxidation with consequent loss, bearing in mind that oxidized glutathione is not precipitated by cuprous oxide; (c) even a trace of cupric compound in the solution likely to be formed by the oxygen in solution enhances auto oxidation and therefore further loss in the yield of glutathione.

It is accordingly among the objects of the invention to provide a process for the recovery of a high yield of glutathione in substantially pure and uncontaminated condition from plasmolyzed yeast extract or the like, by simple procedure that involves the use of conventional, inexpensive reagents, without the need for delicate or highly critical control or elaborate equipment.

Another object is to provide a process of the above type in the performance of which the objectionable oxidation or other degradation of the desired glutathione is greatly inhibited, if not entirely checked.

Another object is to provide a process of the above character by which the recovered glutathione crystals are readily freed of any slight contamination due to impurities, including oxidation and other degradation products upon or between the crystals in order to attain a very high degree of purity, without involving material loss of glutathione.

The invention from one important aspect thereof utilizes the surprising discovery that by reacting the biologic extract with cuprous sulfite, cuprous bisulfite or cuprous metabisulfite or mixtures thereof as distinguished from so reacting it with cuprous oxide, substantially complete precipitation of the glutathione as its cuprous salt is conveniently effected without any of the above indicated objections to the use of cuprous oxide and more particularly, (a) there is no danger of re-solution of the precipitate even in the presence of a substantial excess beyond combining proportions of the cuprous sulfite reagent; (b) the extract thus treated may be allowed to stand for hours before the separation of the precipitate of cuprous glutathione from the supernatant liquor, without the danger of re-solution due to oxidation, and this, since the sulphurous acid liberated as a product of the reaction maintains the solution not only inert but actually in reducing condition; (c) the reducing condition set forth precludes the presence of cupric compound and thereby obviates the danger of auto oxidation of the glutathione which even a trace of cupric compound would engender.

Oxidation of glutathione remains a hazard after decomposition of its metal salt by gassing of the suspension with hydrogen sulfide and especially during the subsequent step of concentration after removal of the precipitated metal sulfide. According to another feature of the invention, the concentration of the glutathione solution is conducted in a reducing atmosphere which is innocuous to the glutathione and protects it from oxidation, hydrogen sulfide being used for such purpose in a preferred embodiment, in order to maintain a reducing environment during the concentration.

Where it is attempted to crystallize the glutathione from its aqueous solution, a low yield results, much of the glutathione remaining in solution. Where it is attempted to precipitate the glutathione from relatively concentrated alcohol solution, various impurities would largely precipitate with the glutathione, yielding an impure product of low melting point.

Another feature of the invention depends on the discovery that if the aqueous solution that has been concentrated to a syrup is diluted with lower alcohol such as ethanol or methanol or mixtures thereof, in amount no less than one quarter and up to five times the volume of the syrup, then a highly selective precipitation of the glutathione is effected, the impurities remaining in solution and the contamination of the resultant precipitate is confined substantially to such impurities from the mother liquor that wet the crystals and are lodged in the interstices therebetween.

According to another feature of the invention, the impurities which in solution wet the crystallized glutathione or are lodged in the interstices therebetween are effectively removed by washing the glutathione filter cake in alcohol solution of the same order of concentration as that in which the selective crystallization was effected in the first instance, preferably following such washings with washings in alcohol solution of progressively higher concentrations by which the residues of impurities are selectively dissolved, with but little loss of glutathione.

In the accompanying drawing, the figure is a flow sheet showing the process of the present invention in one specific embodiment.

Plasmolyzed pressed yeast extract or other suitable biologic source of glutathione may first be prepared in any desired or conventional manner. The resultant extract may be filtered on a Buchner funnel and washed with water desirably acidulated with one to two per cent and preferably with 1.5 per cent of sulfuric acid until the filtrate is acid to Congo red paper. The cake of cell wall, and other solids which is then filtered out, is washed and may be used for preparation of nucleic acid and/or animal feed.

The filtrate is now treated with cuprous sulfite which is slowly introduced in amount no less than equivalent proportions in order to precipitate the glutathione as its cuprous salt. To this end cuprous sulfite, bisulfite or metabisulfite or mixtures thereof, preferably freshly prepared, is intoduced either as such or prepared in situ within the extract as the product of reaction of a sulfite ion releasing substance and a copper ion releasing substance added in suitable amounts to the extract. Where the compound is prepared in situ the sulfite ion source may be the soluble sulfite, bisulfite or metabisulfite of a suitable metal, preferably an alkali or alkali earth metal and most conveniently the sodium compound, and the copper ion source may be derived from any copper salt more soluble than cuprous glutathione, such, for instance, as cuprous or cupric chloride, acetate, nitrate or sulfate.

Where the cuprous sulfite is freshly prepared, it is slowly added in aqueous suspension with stirring to the extract that has desirably been warmed to between about 20 and 45 degrees C., with the gradual formation of a white precipitate of cuprous glutathione. The addition of the sulfite is discontinued when the color of the solution has changed from yellow to light yellow green, at which time the reaction is complete.

Before, during or after the addition of the cuprous sulfite, the pH of the solution or suspension is preferably adjusted to pH between 1 and 3 in which range of acidity the cuprous glutathione complex is most rapidly and completely precipitated. For this purpose a suitable mild alkalizing or acidifying agent, as the case may be, may be added.

The cuprous sulfite reagent may include either cuprous sulfite as such or cuprous bisulfite or cuprous metabisulfite. The term "cuprous sulfite" as such throughout this specification as well as in the claims includes any of these forms of cuprous sulfite as well as mixtures thereof.

The cuprous sulfite reagent is preferably prepared by mixing 100 parts of soluble copper salt, preferably copper sulfate in aqueous solution with 20 to 100 parts of sodium bisulfite. To this end copper sulfate is dissolved and heated to boil in water, whereupon the sodium bisulfite is added and the mixture boiled from three to ten, preferably five minutes. The supernatant liquor is decanted from the brick red precipitate of cuprous sulfite thus formed, which precipitate is then washed with water until all traces of the cupric ion have disappeared as evidenced by a colorless wash water which is no longer blue.

An alternative method of preparing the cuprous sulfite is to add to the copper salt solution, sodium bisulfite either in crystal form or in concentrated solution while stirring until the color of the resultant suspension becomes green.

A specific method of precipitating the glutathione with cuprous salt prepared in situ within the extract, is to add directly to the extract, sodium sulfite, sodium bisulfite or sodium metabisulfite ($Na_2S_2O_5$) and thereupon to titrate the solution with copper sulfate, while stirring until no further white cuprous glutathione precipitate is formed.

Since the sulfurous acid liberated as a reaction product in the precipitation of the cuprous glutathione (CuGHS) keeps the solution in reducing condition, it is not necessary to take special measures for promptly removing the precipitate and prompt filtration is not necessary to guard against oxidation. In fact, it is preferred to allow the treated extract to settle for some hours, for convenient separation, whereupon the supernatant liquor is decanted.

The resultant cuprous glutathione cake is washed with water until most of the sulfate or sulfite ion has been removed as may be checked by the presence of no more than a trace of precipitate upon the addition of barium chloride to the wash.

A minimum of water is now added to the washed cuprous glutathione to produce a slurry which is thereupon gassed with hydrogen sulfide. The resultant precipitate of cuprous sulfide is filtered off and then washed with water that had been saturated with hydrogen sulfide.

The filtrate to which the wash water is desirably added is now concentrated, desirably in a vacuum in the order of 20 mm. Hg within an airtight still. It is preferred according to the present invention, to conduct the concentration in a reducing atmosphere, preferably of hydrogen sulfide.

The glutathione is next caused to crystallize from the syrup. Direct crystallization, as for instance by cooling or refrigerating the solution generally gives but a low yield. According to the invention, there is added to the syrup, which is preferably seeded with a few crystals of glutathione, a lower alcohol, preferably ethanol or methanol or a mixture thereof, by volume between one-quarter (0.25) and five (5) times that of the syrup, the proportion to be added being roughly in inverse ratio to the amount of impurities suspected to be present. The solution is refrigerated, preferably to a temperature but slightly above the freezing point of water, desirably fom 2 to 5 degrees C., for some hours. In the indicated range of concentration of alcohol, the crystallization of the glutathione is selective, the glutathione crystallizing out and settling to the bottom, while small amounts of impurities, including the oxidation, the hydrolyzation and other degradation products of glutathione that are formed despite the precautions above set forth, remain in solution.

After the supernatant liquor has been decanted, the crystals of glutathione will of course carry thereon and therebetween a film of mother liquor in which are dissolved oxidized and other degradation products of glutathione together with other impurities. In order to free the crystals of such impurities, the present invention utilizes our discovery that while 15 grams of the glutathione is soluble at about 15 degrees C. in 100 cc. of water, the solubility is less in dilute alcohol and rapidly drops with increase in concentration of alcohol. The impurities on the other hand are much more readily soluble than glutathione in alcohol of various concentrations, though their solubility decreases with increase in alcohol concentration.

Accordingly, the cake of crystallized glutathione is first washed with a solution of alcohol of approximately the range of concentration in which the original crystallization occurred, of volume desirably approximately equal to that of the crystal cake. In this step most of the impurities dissolve in the wash. The wash is then followed with a second wash with alcohol of concentration of 75 to 80 per cent, desirably of about twice the amount used in the first wash, followed by a third wash with alcohol of concentration of 87 to 100 per cent of volume of about three times the amount of the first wash. Each of the subsequent washes is conducted in the same manner as the first wash above described and the successive washings with alcohol of progressively higher concentrations result in solution and removal from the glutathione crystals of practically the last traces of impurities, and this with but little loss of glutathione since only a small amount of glutathione is dissolved in alcohol of the concentrations and in the amounts set forth.

Before freeing the glutathione crystals of the film of wash solution remaining thereon and in the interstices therebetween, after the alcohol washes set forth, it is desirable to wash the final cake with isopropyl alcohol or ethanol of concentration of 99 to 100 per cent, in amount approximately three times the crystal cake volume and to drive off the volatile component by drying at a temperature of 75 to 100 degrees C., preferably under atmospheric pressure for some hours at 80 to 85 degrees C. The isopropyl or ethyl alcohol forms an azeotropic mixture with some or all of the other wash components and facilitates the driving off in the temperature range indicated of all of the water in the wash remaining on the crystals. Alternatively the product may be dried in a vacuum desiccator at between 75 and 100 degrees C.

Due to errors on the part of the operator, excessive oxidation of the glutathione may occasionally take place as for instance by undue exposure or improper washing, so that the glutathione produced is of low purity as judged by its low melting point. The foregoing discovery may also be availed of to remedy such error, without incurring excessive loss of glutathione.

By way of example, 650 grams of impure powdered glutathione of melting point of 184 degrees C. is mixed with 700 cc. of 50 percent alcohol (formula SDA–3A) and confined in a bottle tightly closed by a screw cap and allowed to stand at 5 degrees C. for several days. The glutathione is then filtered off and washed first with 600 cc. of 50 per cent 3A alcohol, then with 1200 cc. 75 per cent 3A alcohol, and finally with 1800 cc. of 100 per cent 3A alcohol. Upon drying at atmospheric pressure for four hours at 85 degrees to 95 degrees C. there was a yield of 615 grams of glutathione having a melting point of 191 degrees C.

The recovery of glutathione by the process of the present invention is from 25 to 40 per cent or more in excess of that obtained with cuprous oxide and this higher yield coupled with the greater facility of conducting the process spells a marked reduction in the production cost per unit of product. The resultant glutathione product is of high order of purity evidenced by a melting point of from 189 degrees to 192 degrees C.

While the foregoing description is believed adequately to meet the statutory requirements, a few specific examples will nevertheless now be set forth.

*Example 1*

Cuprous sulfite is freshly prepared from about 25 grams of cupric sulfate in 100 ml. of water and raised to boiling point, to which is added about 25 grams of sodium bisulfite and the boiling continued for about five minutes. The red colored precipitate of cuprous sulfite thus formed promptly settles out. The supernatant liquid is decanted and the precipitate is washed with hot water until it is free from soluble copper as evidenced by the wash water being colorless and no longer blue.

The wet, freshly prepared cuprous sulfite is slowly added with stirring to 3.5 liters of acidulated plasmolyzed yeast extract which has first been warmed to 40 degrees C. As the cuprous sulfite is added, a precipitate of cuprous glutathione gradually appears and the operation is continued until the solution turns from yellow to light yellow green. The resultant suspension of cuprous glutathione is permitted to stand until it has settled, whereupon the clear supernatant solution is decanted and discarded. To the precipitate may be added about two grams of filter cel. The suspension is then filtered and well washed with water until only a trace of sulfate or sulfite ion remains in the wash as shown by the formation of only a trace of precipitate on the addition of barium chloride solution.

Before, during or after this addition of cuprous sulfite, there is added sufficient mild alkalizing agent such as sodium acetate, sodium carbonate or dilute sodium hydroxide to bring the pH to about 2.

The washed cuprous glutathione cake amounting to about 30 grams wet weight is slurried with about 15 to 20 ml. of water and hydrogen sulfide is then bubbled through the slurry. Upon completion of the precipitation of the cuprous sulfide, the solution is filtered and the precipitate washed with approximately three cake-volumes of water saturated with hydrogen sulfide in order to minimize oxidation.

The combined filtrate and wash are then concentrated under an absolute pressure of 20 mm. Hg in an airtight still and in a hydrogen sulfide atmosphere to a syrupy consistency of volume of about 7 ml. which is increased to about 9 ml. by the addition of the distilled water washings from the concentrator.

There is now added 5 ml. of 3A anhydrous denatured alcohol (90% ethanol with 10% methanol), the container tightly stoppered and the contents mixed. Upon refrigeration at 5 degrees C. for some hours, the glutathione crystallized from the solution is filtered out and washed with one-cake volume (approximately 5 ml.) of 3A 50 per cent alcohol (equal volumes of alcohol and water). Thereupon it is further washed with two-cake volumes of 75 per cent 3A alcohol (approximately 9 ml.) and thereafter with three-cake volumes (about 13 ml.) of 100 per cent 3A alcohol. In this washing operation, the cake shrinks somewhat in volume due to tamping down and removal of impurities.

Finally the cake is dried under atmospheric pressure for four hours at a temperature between 85 and 90 degrees C. The dried cake of glutathione is pure white, weighs 4.0 grams and has a melting point of 189 degrees C.

*Example 2*

To twelve pounds of the cuprous glutathione cake prepared as in Example 1, containing about one pound of filter cel, one gallon of water is added to make a slurry.

Hydrogen sulfide is then bubbled in under agitation in a glass jar covered to minimize oxidation. When the precipitation of the cuprous sulfide is completed, the solution is filtered and the precipitate washed with four-cake volumes of water saturated with hydrogen sulfide to minimize oxidation, with a resultant brilliant straw yellow filtrate.

The combined filtrate and wash are then concentrated under an absolute pressure of 10 mm. Hg in the receiver, 30 mm. Hg being maintained in the airtight glass still and this concentrating operation is continued in a hydrogen sulfide atmosphere until the volume has been reduced to 1.0 liter of more intense straw yellow color than before concentration.

The contents are transferred to a three liter glass jar and there is also added thereto about 0.1 liter of water used to wash the still. After adding 1.0 liter of methanol, the jar is tightly capped and the contents shaken to dissolve the amorphous precipitate which formed at the interface of the methanol and glutathione solution.

Refrigeration at 2 degrees C. for some days, results in the precipitation of glutathione in copious white crystals.

To facilitate washing the crystals, the precipitate which is in large aggregates, is ground by means of a mortar and pestle, then washed with 700 ml. 60 percent alcohol (three parts of methanol to two parts of water); thereafter with 650 ml. of 80 per cent methanol and then with 1200 ml. of 87 per cent methanol. Finally the glutathione is washed with 1700 ml., 99 per cent plus isopropyl alcohol.

The resultant pure white cake is dried at atmospheric pressure at 80 to 90 degrees C. for six hours. The dried cake is pure white and weighs about 550 grams and has a melting point of 190 degrees C.

While the maximum advantage of the present invention is attained by performing each of the various steps set forth as indicated on the flow sheet, shown in the drawing, or in the foregoing examples or in the antecedent description, it will be understood that the invention is not limited to the use conjointly of all the steps therein described.

Thus, it is within the scope of the invention as claimed herein to perform the precipitation of the cuprous glutathione by the use of cuprous sulfite, regardless what methods are used for decomposing the salt for release of the glutathione and by what procedure the glutathione is recovered from the filtrate, and by what, if any method it is freed of impurities from the mother liquor. It is also within the scope of the invention to conduct the concentration of the glutathione solution in the novel manner herein taught, regardless what methods are used for initially precipitating the metal salt of glutathione, that is, whether cuprous sulfite, salts of copper, lead, mercury, cadmium or cuprous oxide are used for the purpose, and regardless what, if any methods are resorted to, in order to refine the glutathione recovered from the filtrate.

Likewise, it is within the scope of the invention as herein claimed to concentrate, separate and wash the glutathione in the novel manner herein taught, regardless by what procedure the glutathione is originally precipitated as a metal salt and by what procedure that salt is decomposed to release the glutathione therefrom.

As many changes could be made in the above process, and many apparently widely different embodiments of this invention could be made without departing from the scope of the claims, it is intended that all matter contained in the above description or shown in the accompanying drawing shall be interpreted as illustrative and not in a limiting sene.

Having thus described our invention, what we claim as new and desire to secure by Letters Patent of the United States is:

1. The process for recovery of glutathione from biological extracts containing the same, by reacting the extract with cuprous sulfite, with resultant precipitation of cuprous glutathione salt and the liberation of sulfurous acid that serves to maintain said precipitate in a reducing environment, suspending the precipitate in water and treating the suspension with hydrogen sulfide, with decomposition of the salt to release the glutathione, filtering off the resultant precipitate of copper sulfide, concentrating the filtrate and crystallizing out the glutathione.

2. The process for recovery of glutathione from plasmolyzed yeast extract, which comprises reacting said extract with cuprous sulfite until substantially complete precipitation of cuprous glutathione salt, separating the precipitate, washing the same, suspending the same in water, treating the suspension with hydrogen sulfide, filtering off the resulting precipitate of copper sulfide, concentrating the filtrate and crystallizing out the glutathione.

3. The combination recited in claim 2 in which the reagent that precipitates the glutathione as the cuprous glutathione salt is slowly added to the plasmolyzed extract maintained at a temperature of 20 to 45 degrees C. with stirring until the color of the solution changes from yellow to light yellow green.

4. The combination as recited in claim 2 in which the precipitation of cuprous glutathione salt is facilitated by bringing the extract to a pH of 1 to 3.

5. The process of recovery of glutathione from yeast plasmolyzate, which comprises reacting the same with the freshly precipitated reaction product of soluble cupric salt and sodium bisulfite that has been washed with water until the cupric ion has disappeared, by slowly adding such reaction product in aqueous suspension to a plasmolyzate of yeast until the glutathione has been completely precipitated as the cuprous glutathione salt, removing and washing the precipitate, suspending said precipitate in water, treating the same with hydrogen sulfide, filtering off the resultant precipitate of copper sulfide, concentrating the filtrate and crystallizing out the glutathione.

6. The process for recovery of glutathione from plasmolyzed yeast extract, which comprises slowly adding thereto a suspension composed of copper sulfate solution to which has been slowly added concentrated sodium sulfite until the glutathione has been precipitated as the cuprous glutathione salt, separating and washing the precipitate, suspending the same in water, treating the same with hydrogen sulfide, separating therefrom the resultant precipitate of copper sulfide, concentrating the resultant filtrate and crystallizing out therefrom the glutathione.

7. The process for recovery of glutathione from plasmolyzed yeast extract which comprises adding to the extract a compound which releases sulfite ions and then slowly adding a substance providing copper ions until no further precipitation occurs, with resultant precipitation from the extract of copper glutathione salt, removing the precipitate, washing the same, suspending the same in water, treating the suspension with hydrogen sulfide for complete precipitation of cuprous sulfide, removing the precipitate, concentrating the resultant filtrate and crystallizing therefrom the glutathione.

8. The process of protecting glutathione from oxidation during concentration, which comprises performing the concentration in an environment of hydrogen sulfide.

9. The process for recovery of glutathione from plasmolyzed yeast extract, which comprises treating the extract by slowly adding cuprous sulfite suspension thereto until the cuprous glutathione salt thereby formed has been completely precipitated, allowing the precipitate to settle in the reducing environment of the sulfurous acid liberated in the reaction, decanting the supernatant liquor, separating and washing the precipitate, dispersing the precipitate in water, treating the suspension thus formed with hydrogen sulfide with resultant precipitation of cuprous sulfide and release of glutathione, filtering out the precipitate and concentrating the filtrate in an atmosphere of hydrogen sulfide to maintain reducing conditions during the concentration and thereupon crystallizing out the glutathione.

10. The process of selectively crystallizing glutathione from mother liquor that contains also significant proportions of impurities including the oxidized, hydrolyzed and other forms of degradation product of glutathione, by concentrating the liquor, adding thereto alcohol of the group consisting of ethanol, methanol and mixtures thereof for alcohol concentration of 20 to 80 per cent with resultant crystallization under atmospheric pressure of the glutathione while the degradation products therein remain in solution, filtering out and washing the precipitate.

11. The process for recovery of substantially pure glutathione from mother liquor that has in solution therein the glutathione and significant proportions of various impurities, including the oxidation and hydrolysis product thereof, which comprises adding to the concentrated syrup, alcohol of the group consisting of ethanol, methanol and mixtures thereof in amounts between 0.25 to 5 volumes of the syrup, with resultant selective crystallization under atmospheric pressure of glutathione therefrom, filtering out the crystals and washing the same with substantially the same concentration of alcohol that had been used in said selective crystallization with resultant removal by solution of impurities upon and between the crystals of glutathione.

12. The combination recited in claim 11 in which the crystals are washed in a sequence of alcohol baths of successively higher concentrations of the alcohol.

13. The combination recited in claim 11 in which the crystals are washed with alcohol in a sequence of steps utilizing successively higher concentrations of the alcohol, and in which the crystals are finally washed with substantially 100 per cent alcohol selected from ethanol and isopropanol and then dried at a temperature between 75 and 100 degrees C.

14. The process for recovery of glutathione from plasmolyzed yeast extract, which comprises adding thereto cuprous sulfite, removing the resultant precipitate of cuprous glutathione salt, washing and dispersing the precipitate in water, treating the dispersion with hydrogen sulfide for precipitation of cuprous sulfide and release of glutathione, filtering out the cuprous sulfide, concentrating to a syrup the filtrate under reducing conditions, diluting the filtrate with from 0.25 to 5 parts of alcohol selected from the group consisting of ethanol, methanol and mixtures thereof with substantially selective crystallization of the glutathione, while the oxidation and the hydrolyzation products and other impurities thereof remain in solution, filtering out the crystalline precipitate and washing the resultant cake with a solution of the alcohol of substantially the concentration of that in which the original crystallization was effected and finally drying the glutathione yield.

15. The combination recited in claim 14 in which successive washes are performed of the cake with successively higher concentrations of alcohol wash and in which the crystals are finally washed with substantially 100 per cent isopropyl alcohol and then dried under moderate heat.

16. The process for recovery of glutathione from plasmolyzed yeast extract, which comprises treating the acidified extract with cuprous sulfite, with resultant precipitation of cuprous glutathione salt and liberation of sulfurous acid that maintains a reducing environment, allowing the preparation to stand for settling of the precipitate, decanting the supernatant liquor, washing the precipitate, dispersing the same in water, treating the same with hydrogen sulfide with resultant precipitation of cuprous sulfide, removing the precipitate of cuprous sulfide, concentrating the filtrate to a syrup in an atmosphere of hydrogen sulfide to maintain reducing conditions, diluting the syrup with 0.25 to 5 volumes of alcohol of the group consisting of ethanol, methanol and mixtures thereof, with resultant selective precipitation of glutathione, while the impurities remain in solution, and filtering out and drying the precipitate.

17. The combination recited in claim 16 in which the acidity of the extract is reduced by addition thereto of mild alkali to bring the pH thereof to between 1 and 3, with resultant enhanced facility of precipitation of cuprous glutathione salt.

References Cited in the file of this patent

Hopkins, J. Biol. Chem., vol. 84, pp. 284–290 (1929).
Perry, "Chemical Engineers' Handbook" (second ed.), (McGraw-Hill; New York; 1941), pp 1598–9.